United States Patent [19]
Schmidt

[11] Patent Number: 5,290,153
[45] Date of Patent: Mar. 1, 1994

[54] TWO STAGE PUMP ASSEMBLY
[75] Inventor: Michael R. Schmidt, Carmel, Ind.
[73] Assignee: General Motors Corporation, Detroit, Mich.
[21] Appl. No.: 28,509
[22] Filed: Mar. 9, 1993
[51] Int. Cl.⁵ .............................................. F04B 49/08
[52] U.S. Cl. .................................... 417/216; 417/223
[58] Field of Search ................... 417/216, 223, 199.1, 417/219, 214

[56] References Cited
U.S. PATENT DOCUMENTS

| | | | |
|---|---|---|---|
| 2,464,144 | 3/1949 | McConaghy | 415/18 |
| 3,105,441 | 10/1963 | Grill et al. | 417/216 |
| 3,961,859 | 6/1976 | Cygnor et al. | 417/223 |

Primary Examiner—Richard A. Bertsch
Assistant Examiner—Peter Korytnyk
Attorney, Agent, or Firm—Donald F. Scherer

[57] ABSTRACT

A two stage main pump has a first pump drivingly connected to a transmission input shaft, and a second pump is drivingly connected to the output member of a friction clutch that is spring applied and pressure released. The input member of the clutch is driven, through a pair of one-way clutches, by the transmission input shaft or the vehicle output, whichever is rotating more rapidly.

4 Claims, 3 Drawing Sheets

TWO STAGE PUMP ASSEMBLY

The invention herein described was made in the course of work under a contract or sub-contract thereunder with the Department of the Army.

TECHNICAL FIELD

The present invention relates generally to control pumps for use in conjunction with vehicular transmissions. More particularly, the present invention relates to the drive mechanisms for such pumps. Specifically, the present invention relates to pump drive mechanisms which accommodate multiple pumps and multiple input drive sources.

BACKGROUND OF THE INVENTION

The main supply pumps in transmissions are generally geared directly to the engine, and the output flow of such supply pumps is, therefore, proportional to the speed of the engine. The flow requirements of the transmission, on the other hand, are not generally a function of engine speed. Accordingly, the supply pump for an automatic transmission has heretofore been sized to provide the transmission flow requirements at engine idle speed. This design approach results in excess capacity at elevated engine speeds. Thus, a considerable amount of power is wasted at higher pump speeds when the excess fluid must be exhausted through a system relief valve.

The prior art systems have attempted to reduce this loss by using variable displacement vane pumps and two stage pumps. While variable displacement pumps will reduce the power requirements at high speeds, such pump assemblies are considerably more expensive than two stage pumps. For that reason the most common solution has been to adopt and use two stage pumps. In two stage pump mechanisms, the first stage pump provides continuous fluid flow whenever the engine is operating. On the other hand, the second stage pump flow is directed into the main circuit, or dumped to sump, depending on the requirements of the transmission. Dumping a large amount of oil to sump still requires a significant amount of power. To reduce the power requirement of the second stage even further, the pump inlet is connected to atmosphere in order to ingest air into the pump instead of oil. This solution is noisy, complicates the control mechanism and retards the response of the second stage pump when fluid flow is required from the second stage pump.

Another prior art approach has been to include both an engine driven pump and an output drive (i.e.: the vehicle output drive) pump. Generally, the output driven pump is dumped to sump when the fluid output therefrom is not required by the transmission. This reduces the power consumption slightly when compared to input driven two stage pumps. The output driven pump concept is attractive for use in conjunction with some tracklaying vehicles, particularly when heavy braking loads exist. The output driven pump is generally used to provide cooling while the engine driven pump supplies fluid for the other transmission functions. The output driven pump will also supply fluid to maintain the transmission operable as long as the vehicle is moving, even in the event that the engine has stopped. As such, this pump will supply lubricant flow even when the vehicle is being towed.

SUMMARY OF THE INVENTION

It is, therefore, a primary object of the present invention to provide an improved, two stage pump having one stage that performs as both an input driven pump and as an output driven pump.

It is another object of the present invention to provide an improved, two stage pump wherein one stage is controlled by a selectively engageable clutch.

It is a further object of the present invention to provide an improved, two stage pump wherein one stage thereof is powered by a selectively engageable clutch member which has an input portion thereof drive through a pair of one-way drive devices.

These and other objects of the invention, as well as the advantages thereof over existing and prior art forms, which will be apparent in view of the following detailed specification, are accomplished by means hereinafter described and claimed.

In general, the present invention seeks to retain the advantages of the two stage and output driven pumps while reducing the power requirement of these systems. To that end the present invention incorporates a two stage, clutchable pump. The first stage pump is continuously driven by the engine, or transmission input, to supply a continuous flow of oil to the transmission. The second stage pump supplements the oil flow of the first stage, when required. A spring activated clutch is operable to connect the second stage pump to a power source. The clutch is pressure released, or disengaged, to eliminate the power consumption of the pump during the time it is idle.

The clutch input member is selectively driven through two, one-way clutches. One of these clutches is driven by the engine, or transmission input, and the other is driven by the output of the vehicle, or the output of the transmission. Thus, the second stage pump can be driven by either the input or output of the transmission. This pump, therefore, performs as an input driven pump when the transmission input is rotating faster than the output, or as an output pump when the output is rotating faster than the input. In addition the pump is idle whenever the spring activated clutch is disengaged by pressure. The rotating, open clutch will produce some spin losses in the transmission when the second stage pump is not rotating. However, these losses have been found to be considerably less than the losses associated with a pump being dumped to exhaust.

The use of the dual input, one-way clutches permits the second stage pump to perform as an output driven pump. Because the clutch is spring applied, the output shaft will power the pump whenever the vehicle is towed, or coasting, with the engine inoperable. This two stage pump therefore eliminates the need for an output driven pump in vehicles where such a pump is a design requirement.

One exemplary embodiment of a two stage pump embodying the concepts of the present invention, and adapted for use with a power transmission, is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
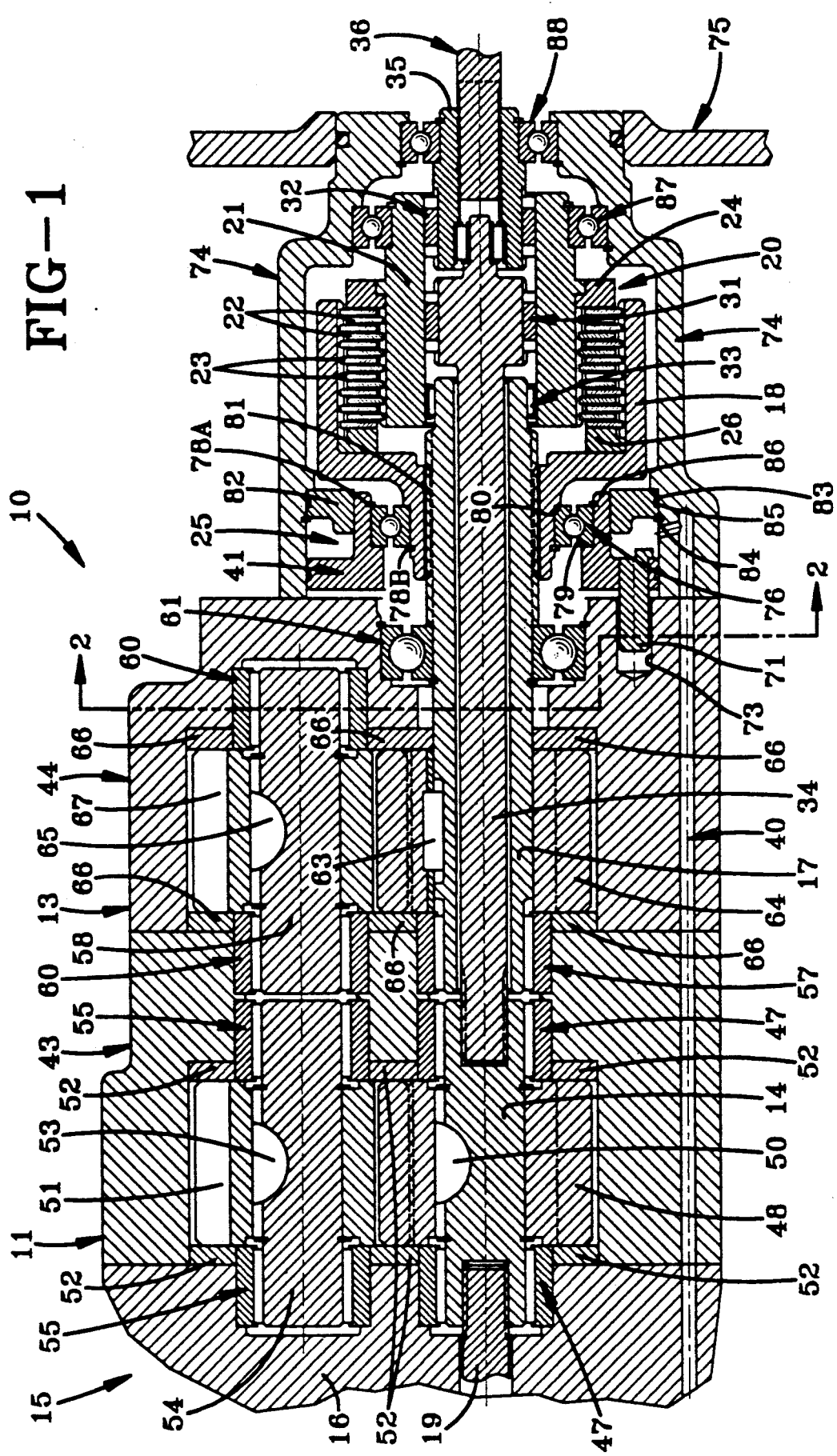
FIG. 1 is a longitudinal, cross sectional view of a two stage pump according to the present invention.
Figure 2:
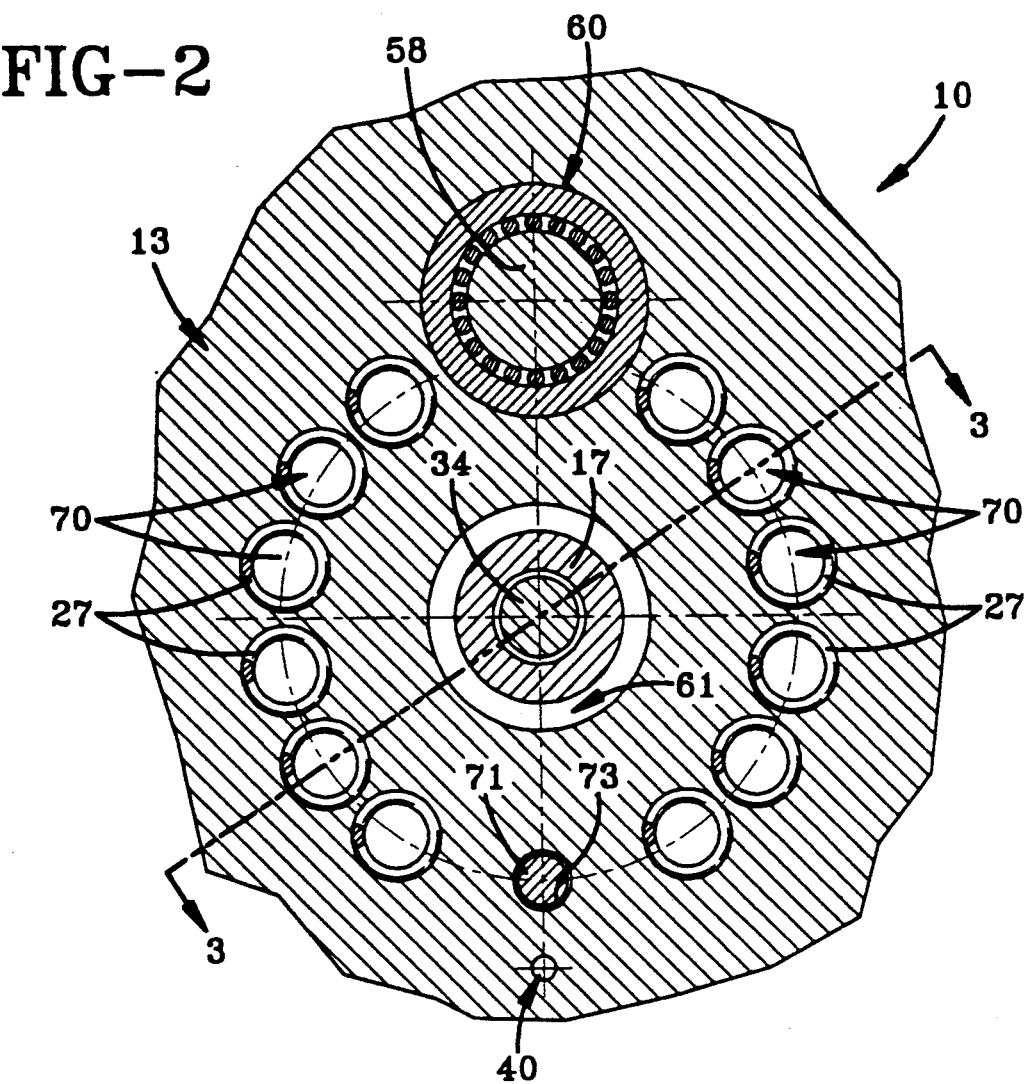
FIG. 2 is a modestly enlarged, transverse, cross sectional view taken substantially along line 2—2 of FIG. 1.

One representative form of a two stage pump assembly embodying the concepts of the present invention is designated generally by the numeral 10 on the accompanying drawings. The representative two stage pump assembly 10 is comprised of a first, or front, pump assembly 11 and a second, or rear, pump assembly 13. The front pump assembly 11 has a drive shaft 14 which is continuously driven at a rotary speed proportional to engine speed, or the transmission input speed. The engine, transmission and control are conventional units, the construction of which is well known. As such, the engine, transmission and control are represented by the black box depicted in FIG. 4, one wall 16 of the casing in which the components collectively identified by the numeral 15 are housed is represented in FIGS. 1 and 2. The output shaft from the engine, or the transmission input shaft, is identified at 19, and the input shaft 19 may be spline-connected to the drive shaft 14. The rear pump assembly 13 is driven by a first sleeve shaft 17 which is continuously drivingly connected with the output hub 18 of a spring activated, clutch assembly 20.

Figure 3:
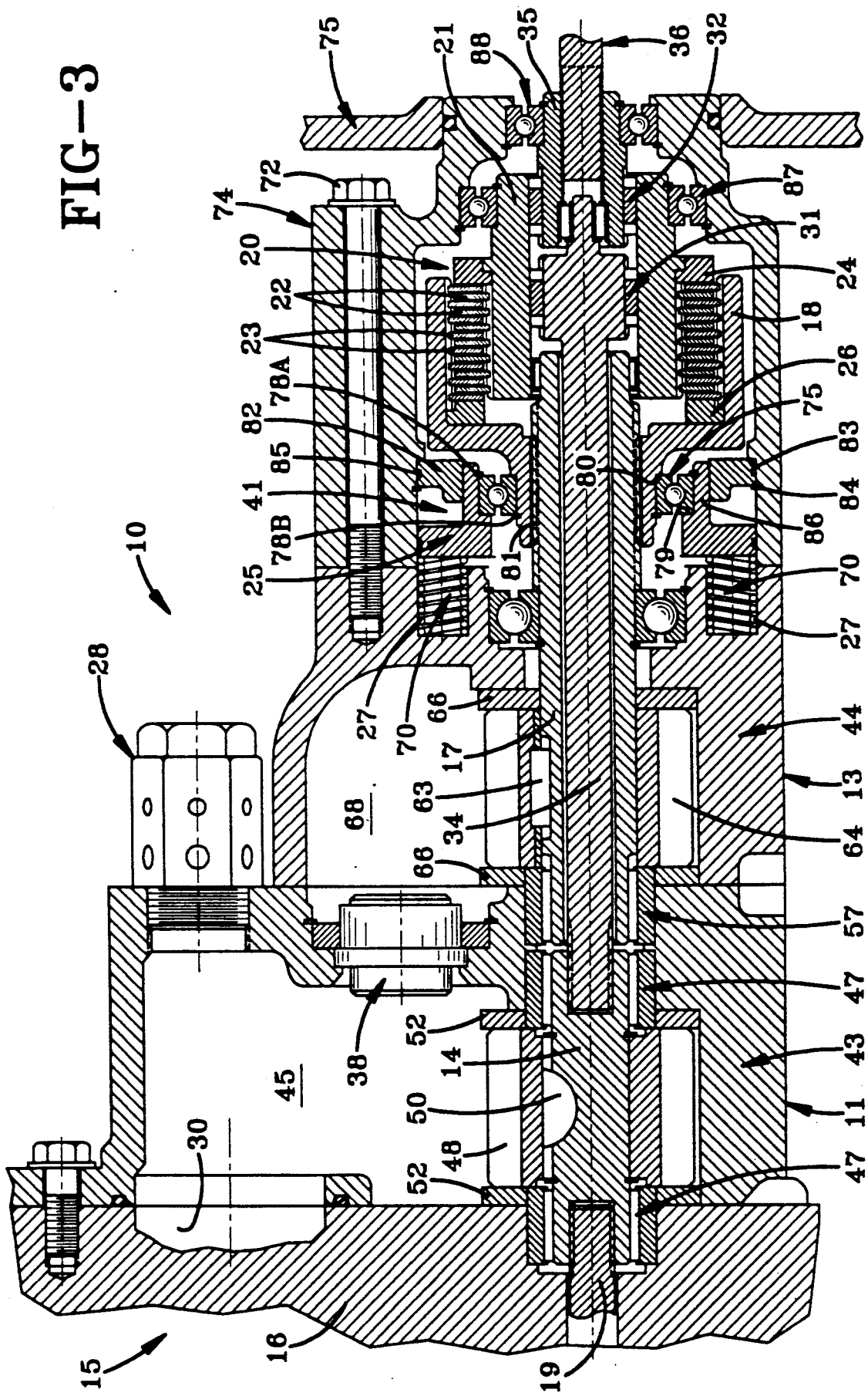
FIG. 3 is a modestly reduced, longitudinal cross sectional view taken substantially along line 3—3 of FIG. 2; and, FIG. 4 is a schematic representation of the two stage pump and control valving assembly embodying the concepts of the present invention which appears on the same sheet of drawings as FIG. 2.

The clutch assembly 20 also has an input hub 21. A plurality of drive disks, or torque plates, 22 are splined to the input hub 21, and a plurality of driven disks, or torque plates, 23 splined to the output hub 18. The disks 22 and 23 are alternately interleaved in a conventional manner to be selectively urged into frictional engagement between a backing ring 24 and a compression apply ring 26 that is movable with the output hub 18 and an associated ring piston assembly 25. Specifically, a plurality of apply springs 27 (FIG. 3) urge the ring piston assembly 25 to move the compression apply ring 26 carried on the output hub 18 axially toward the backing ring 24 in order to compress the disks, or torque plates, 22 and 23 therebetween, as best seen in FIGS. 1 and 3. When thus forced into compressive abutment, the disks 22 and 23 cooperate to provide a rotary, friction, drive connection between the input hub 21 and output hub 18 in a well known manner.

Figure 4:
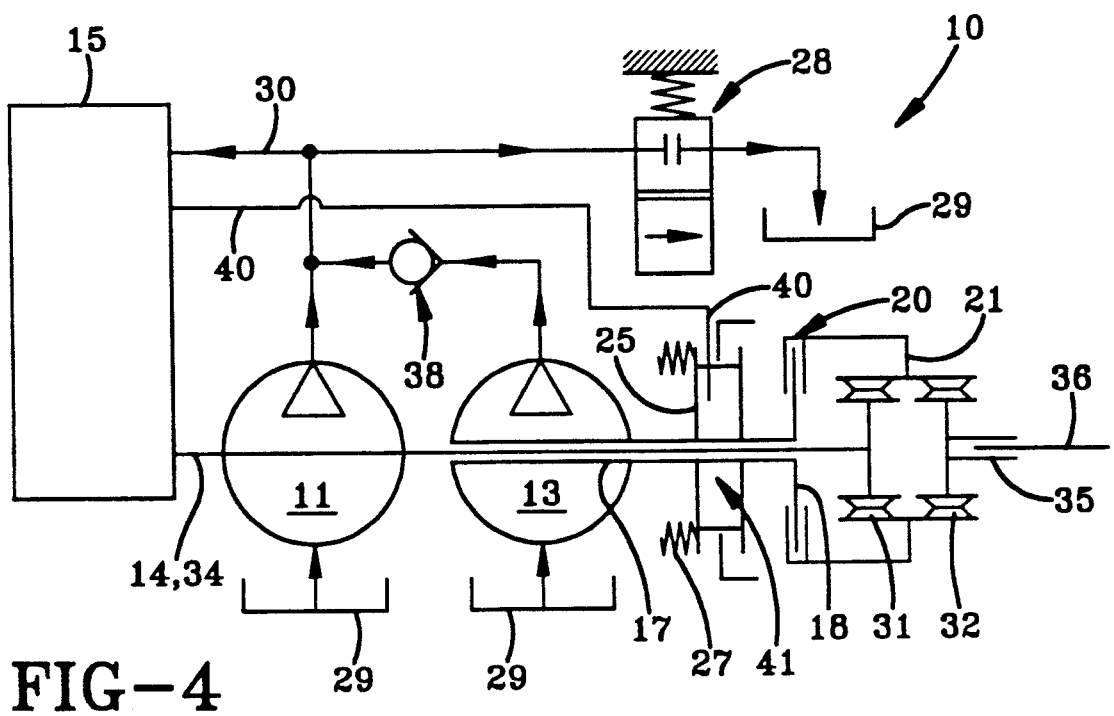

As depicted in the schematic representation of FIG. 4, the first, or front, pump 11 provides a continuous flow of oil when the engine, or the transmission input shaft 19, is rotating. The pressure of the hydraulic fluid flowing from the pump 11 into passage 30 is limited by a cold weather relief valve 28 that discharges to the sump 29. The passage 30 communicates with the engine/transmission/control 15. The control operates in a conventional manner to establish the various drive ratios provided by the transmission. The hydraulic fluid in passage 30 also supplies the lubrication for the rotating components of the transmission.

The second, or rear, pump 13 rotates only when the clutch 20 is engaged and when the clutch input hub 21 is rotating. The input hub 21 is connected to—and receives its rotational input through—a pair of conventional, one-way clutches 31 and 32. The input hub 21 is, therefore, in part supported by a needle bearing assembly 33 that is disposed between one end of an extension shaft 34 and the input hub 21. One-way clutch 31 is operatively connected to receive input torque from an extension shaft 34, and the one-way clutch 32 is operatively connected to receive input torque from a second sleeve shaft 35. The extension shaft 34 is driven by the engine, or transmission input shaft 19, through the drive shaft 14, and the second sleeve shaft 35 is drivingly connected with the conventional final drive of the vehicle, or transmission output, as through a shaft extension 36. As such, the clutch input hub 21 will rotate with either the extension shaft 34 or the second sleeve shaft 35, whichever is rotating faster.

The clutch output hub 18 will rotate to drive the rear pump 13 only when the clutch 20 is engaged. As set forth above, the clutch 20 is spring activated. Therefore, the normal operating condition of the clutch 20 is the engaged state. When the pump 13 is operating, the fluid discharged therefrom is directed through a check valve 38 to the passage 30. Thus, the output of the front and rear pumps 11 and 13, respectively, combine to provide hydraulic fluid to the engine/transmission/control assembly 15. However, under certain operating conditions, such as high input speeds, it is desirable to discontinue operation of the rear pump 13. Therefore, it is preferred that some provision be made to effect selective disengagement of the clutch 20.

Disengagement of the clutch 20 is accomplished by directing the pressurized hydraulic fluid from the control 15 through a passage 40 to a control chamber 41 disposed adjacent the ring piston assembly 25. As best seen in FIGS. 1 and 3, the fluid pressure in chamber 41 will be effective, at a predetermined value, to move the ring piston assembly 25 axially to disengage the clutch 20. When the clutch 20 is disengaged, the output hub 18 can no longer transmit power to the pump 13, regardless of the rotary condition of the input hub 21. The pressure of the fluid within passage 40 is, at times, determined by the engine/transmission/control assembly 15, which may utilize electronic control technology such as a conventional, central processing unit, or digital computer.

As best seen in FIGS. 1 and 3, the pump assemblies 11 and 13 are received in respective housing members 43 and 44 which may be secured together. The housing member 43, in turn, may be secured to the casing wall 16 of the engine/transmission/control assembly 15. The housing member 43 includes an output chamber 45 which directs the output flow of pump 11 to the passage 30. The relief valve 28 may be attached to housing 43 for communication with the output chamber 45. The housing 43 rotatably supports the drive shaft 14 between a pair of spaced needle, or roller, bearings 47. A key member 50 secures a gear member 48 to the shaft 14 for simultaneous rotation. The gear 48 meshes with a gear 51 which is similarly connected by a key 53 to a gear shaft 54 for simultaneous rotation. The gear shaft 54 is rotatably supported in the housing 43 by a pair of needle, or roller, bearings 55 which may be identical with the bearings 47. The meshing gears 48 and 51 form the pumping elements of the first pump 11. Thus, the pump 11 may be a conventional gear pump. However, it should be understood that any of the well known types of transmission main pumps can be used. When using a conventional gear pump 11 it is generally desirable to interpose a preferably hardened, wear plate 52 between each gear 48 and 51 and those portions of both the housing 43 as well as the wall 16 between which the gears 48 and 51 are disposed.

As shown, the housing 43 may rotatably support one end of the first sleeve shaft 17 in a bearing 57 and also rotatably support one end of a gear shaft 58 in a bearing 60. The housing 44 also rotatably supports the medial portion of the first sleeve shaft 17 in a conventional ball bearing 61 that is disposed in axially spaced relation with respect to the bearing 57. In addition, the housing 44 may also support the other end of gear shaft 58 in a bearing 60. The first sleeve shaft 17 is connected, as by a key 63, to a gear member 64, and the gear shaft 58 is connected, as by a key 65, to a gear member 67 that meshes with the gear member 64. The gear members 64 and 67 form the pumping elements of the second pump 13 which is also depicted as a conventional gear pump. However, any of the well known types of transmission main pumps can be used as the second pump 13. The second pump 13 may also employ preferably hardened wear plates 66 that are interposed between each gear 64 and 67 and those portions of both the housing members 44 and 43 between which the gears 64 and 67 are disposed. A pump outlet chamber 68 is provided within the housing 44, and the pump outlet chamber 68 communicates through the check valve 38 and the chamber 45 to the passage 30.

A plurality of spring chambers 70 are also formed in the housing 44. Respective apply springs 27 which abut the ring piston assembly 25 are disposed within the spring chambers 70. A pin member 71 (FIGS. 1 and 2) is secured to the ring piston assembly 25 and is slidably disposed in a cylindrical recess 73 formed in the housing 44. The disposition of the pin 71 within the recess 73 prevents the ring piston assembly 25 from rotating relative to the housing 44 and/or the springs 27. The ring piston assembly 25 is slidably supported for axial translation within a clutch housing 74. The clutch housing 74 may be secured to the housing 44, as by bolts 72. The two stage assembly 10—including the front pump assembly 11, the second pump assembly 13 and the clutch housing 74—may be supported as a unit in a casing 75.

The ring piston assembly 25 is connected to the clutch output hub 18 for mutual axial translation, but relative rotation, through the conventional ball bearing assembly 76 and the locking rings 78A and 78B. As depicted, the locking ring 78A secures the ball bearing assembly 76 against the shoulder 79 on the ring piston assembly 25, and locking ring 78B secures the ball bearing assembly 76 against the shoulder 80 on the output hub 18. The output hub 18 is, in turn, secured to the first sleeve shaft 17 for simultaneous rotation, as by a spline connection 81. This connection permits the output hub 18 and gear member 64 to rotate in unison with the first sleeve shaft 17 while the ring piston assembly 25 and springs 27 remain stationary with respect to the housings 44 and 74.

An annular wall 82 is positioned in the housing 74 between a shoulder 85 and a lock ring 84. A sealing means such as the O-ring 83 effects a desired seal between the annular wall and the clutch housing 74. The annular wall 82 is slidingly engaged by an axial extension 86 of the ring piston assembly 25 to form the control chamber 41 which, as previously described, communicates with the passage 40 that extends through the housings 43, 44 and 74.

The clutch housing 74 not only supports but also determines and maintains the axial location of the input hub 21 by virtue of a ball bearing assembly 87. In addition, the clutch housing 74 rotatably supports the output driven sleeve shaft 35 in a conventional ball bearing 88. The second sleeve shaft 35 may be spline-connected to the shaft extension 36 which represents a component in the vehicle final drive, or transmission output.

A two stage pump assembly 10 embodying the concepts of the present invention provides a compact and independent assembly. The pump assembly 10 can be manufactured and assembled independently of the transmission for connection thereto at final assembly. This permits various size pump and clutch assemblies to be assembled for use in transmission families. Some transmission installations may require larger displacements in either, or both, of the pump assemblies 11 and 13. The transmission assembly may, for example, include a hydraulic retarder which will increase the oil capacity requirements of the transmission pump system. The transmission and engine assembly may have a number of hydraulic accessories that can use the output of the rear pump to perform the function for which they are designed.

Generally, when the vehicle is operating at normal speeds, the control portion of the engine/transmission/-control 15 will be effective to distribute pressurized hydraulic fluid to the chamber 41 to disengage the clutch. The control 15 will also provide for the exhausting of hydraulic fluid from the chamber 41 to establish the actuation of the clutch by the springs 27. For example, if the vehicle is equipped with a hydraulic retarder and the operator applies the brakes when the chamber 41 is pressurized, the control 15 can be operable to exhaust the chamber 41, thereby engaging the clutch 20 so that the output flow therefrom can be used to activate and cool the retarder. Also, if the transmission operating temperature becomes elevated, due to the work performed, the pump 13 can be brought into operation to add cooling oil to the transmission lubrication circuit. While the output flow of the pump 13 is shown as complementing the flow of the pump 11, a separate flow circuit can be employed, if desired. This will permit the output oil of the pump 13 to be used in many devices, or for specific devices or purposes, only. The number of functions that the pump 13 can supply will, to some extent, be established by the control system. For example, it is possible to have the output of pump 13 connected to a separate control valve system that can be controlled to provide the desired functions.

Another feature of the present invention is that an output driven pump is provided. When the engine portion of the engine/transmission/control 15 is inoperable, the springs 27 will apply the clutch 20 by moving the ring piston assembly 25, and the associated output hub 18, axially to effect frictional engagement of the disks 22 and 23. The one-way clutch 32 will supply power to the input hub 21 from the second sleeve shaft 35 when the vehicle is towed. Thus, the pump 13 will be operable to supply lubrication to the transmission components during towing. Also, the output flow of the pump 13 can be utilized, during towing, to engage the friction devices in the transmission which will permit the engine to be driven by the vehicle. If the engine was inoperable because of a lack of starting power, the engine can be started by towing the vehicle.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interupted in accordance with the breadth to which they are fairly, legally and equitably entitled.

I claim:

1. A two stage pump comprising:
    a first pump assembly continuously drivingly connected to a rotary member of a transmission;
    a second pump assembly;
    a selectively operable clutch assembly having an input member, an output member, a plurality of alternately spaced friction disk means for selectively drivingly connecting the input and output members, piston means for controlling the engagement of the friction disk means, spring means for enforcing said piston means into an engaged condition, and pressure chamber means selectively pressurizable for urging said piston means to a disengaged condition;
    first one-way drive means for selectively connecting said clutch input member to said rotary member; and,
    second one-way drive means for selectively connecting said clutch input member to a vehicle rotary output member.

2. A two stage pump, as set forth in claim 1 wherein:
    said first one-way drive means drives the clutch input member when said rotary member is rotating faster than said vehicle rotary output member.

3. A two stage pump, as set forth in claim 1 wherein:
    said second one-way drive means will drive the clutch input member when said vehicle rotary output member is rotating faster than said rotary member.

4. A two stage pump, as set forth in claim 1, wherein:
    said piston means is operable at a predetermined pressure in said pressure chamber means to prevent transmission of power from said clutch input member to said clutch output member.

* * * * *